(12) United States Patent
Moore et al.

(10) Patent No.: US 12,141,534 B2
(45) Date of Patent: Nov. 12, 2024

(54) PERSONALIZING AUTOMATED CONVERSATIONAL SYSTEM BASED ON PREDICTED LEVEL OF KNOWLEDGE

(71) Applicant: International Business Machines Corporation, Armonk, NY (US)

(72) Inventors: Robert John Moore, San Jose, CA (US); Eric Young Liu, Santa Clara, CA (US); Shun Jiang, San Jose, CA (US); Chung-hao Tan, San Jose, CA (US); Lei Huang, Mountain View, CA (US); Guangjie Ren, Belmont, CA (US); Sungeun An, Lilburn, GA (US)

(73) Assignee: International Business Machines Corporation, Armonk, NY (US)

( * ) Notice: Subject to any disclaimer, the term of this patent is extended or adjusted under 35 U.S.C. 154(b) by 335 days.

(21) Appl. No.: 17/566,108

(22) Filed: Dec. 30, 2021

(65) Prior Publication Data

US 2023/0214601 A1    Jul. 6, 2023

(51) Int. Cl.
*G06F 40/35*    (2020.01)
*G06N 5/02*    (2023.01)

(52) U.S. Cl.
CPC ............... *G06F 40/35* (2020.01); *G06N 5/02* (2013.01)

(58) Field of Classification Search
CPC .................................. G06F 40/35; G06N 5/02
See application file for complete search history.

(56) References Cited

U.S. PATENT DOCUMENTS

| | | | |
|---|---|---|---|
| 7,305,443 B2 | 12/2007 | Larsen | |
| 9,600,769 B1 | 3/2017 | Liu et al. | |
| 9,997,157 B2 | 6/2018 | Akbacak et al. | |
| 2011/0153540 A1* | 6/2011 | Beg | G06F 11/079 706/46 |
| 2016/0142848 A1* | 5/2016 | Saltwell | H04S 1/002 381/17 |

(Continued)

FOREIGN PATENT DOCUMENTS

| | | |
|---|---|---|
| CN | 110781280 A | 2/2020 |
| CN | 111984770 A | 11/2020 |

OTHER PUBLICATIONS

Nikita Moghe et al., "Towards Exploiting Background Knowledge for Building Conversation Systems," arXiv:1809.08205v1 (Sep. 2018) (17 pages).

(Continued)

*Primary Examiner* — Ibrahim Siddo
(74) *Attorney, Agent, or Firm* — Gavin Giraud

(57) ABSTRACT

Techniques for personalizing an AI automated conversational system are provided. In one aspect, a method for personalizing an automated conversational system includes: making predictions of a familiarity of a user with concepts needed to understand a standard output utterance based on the familiarity of an aggregate of users and a background knowledge model of the concepts and related concepts, wherein the standard output utterance assumes that the concepts are known; and giving, by the automated conversational system, an output utterance that is tailored to the user given the predictions. For instance, the automated conversational system can give the standard output utterance to the user when it is predicted that the user is familiar with the concepts, or a nonstandard output utterance when it is it is predicted that the user is unfamiliar with at least one of the concepts.

16 Claims, 13 Drawing Sheets

(56) References Cited

U.S. PATENT DOCUMENTS

| | | |
|---|---|---|
| 2016/0180216 A1 | 6/2016 | Allen et al. |
| 2017/0024375 A1 | 1/2017 | Hakkani-Tur et al. |
| 2017/0024652 A1* | 1/2017 | Kipersztok .............. G06N 7/01 |
| 2019/0138651 A1* | 5/2019 | Xiong ................... G06F 16/353 |
| 2020/0074319 A1 | 3/2020 | Lecue et al. |

OTHER PUBLICATIONS

Jinghui Qin et al., "Dynamic Knowledge Routing Network For Target-Guided Open-Domain Conversation," arXiv:2002.01196v2 (Mar. 2020) (8 pages).

Q. Vera Liao et al., "A Measure for Dialog Complexity and its Application in Streamlining Service Operations," arXiv:1708.04134v1 (Aug. 2017) (11 pages).

Zhibin Liu et al., "Knowledge Aware Conversation Generation with Explainable Reasoning over Augmented Graphs," Proceedings of the 2019 Conference on Empirical Methods in Natural Language Processing and the 9th International Joint Conference on Natural Language Processing, pp. 1782-1792 (Nov. 2019).

Shijun Yu et al., "A knowledge infrastructure for intelligent query answering in location-based services," Geoinformatica 14(3): 379-404 (Jan. 2010).

Li Xiang et al., "Personal Knowledge Graph Population from User Utterances in Conversational Understanding," 2014 IEEE Spoken Language Technology Workshop (SLT), IEEE, Dec. 2014, pp. 224-229.

Disclosed Anonymously, "Voice Interface Responses based on Prior User Interactions," IPCOM000257361D, Feb. 5, 2019, 6 pages.

Mell et al., "The NIST Definition of Cloud Computing," NIST Special Publication 800-145, Sep. 2011 (7 pages).

\* cited by examiner

PERSONALIZING AUTOMATED CONVERSATIONAL SYSTEM BASED ON PREDICTED LEVEL OF KNOWLEDGE

FIELD OF THE INVENTION

The present invention relates to conversational artificial intelligence (AI), and more particularly, to techniques for personalizing an AI automated conversational system based on a predicted level of knowledge a recipient has on a particular topic of conversation.

BACKGROUND OF THE INVENTION

Conversational artificial intelligence (AI) refers to technologies that a user can talk to. Namely, these technologies use data, machine learning and natural language processing to simulate human conversational interactions.

However, one feature of human conversation that conversational AI generally lacks is recipient design. Recipient design refers to a tailoring of the form of an utterance for its particular recipient. In computer science terms, recipient design can be thought of as personalizing the wording of a system message provided to the recipient.

Recipient design largely involves choosing reference forms, levels of detail and actions based on assumptions about the knowledge a particular recipient has about a certain topic. AI utterances that are not tailored to the knowledge of the particular user are harder for that user to understand than those that are well-tailored. Thus, the better the assumption is about the recipient's knowledge on a certain topic, the better-tailored the response will be.

Therefore, improved conversational AI techniques for predicting a recipient's knowledge-level for tailoring utterances to that particular recipient would be desirable.

SUMMARY OF THE INVENTION

The present invention provides techniques for personalizing an artificial intelligence (AI) automated conversational system based on a predicted level of knowledge a recipient has on a particular topic of conversation. In one aspect of the invention, a method for personalizing an automated conversational system is provided. The method includes: making predictions of a familiarity of a user with concepts needed to understand a standard output utterance based on the familiarity of an aggregate of users and a background knowledge model of the concepts and related concepts, wherein the standard output utterance assumes that the concepts are known; and giving, by the automated conversational system, an output utterance that is tailored to the user given the predictions.

In another aspect of the invention, another method for personalizing an automated conversational system is provided. The method includes: making predictions of a familiarity of a user with concepts needed to understand a standard output utterance based on the familiarity of an aggregate of users and a background knowledge model of the concepts and related concepts, wherein the standard output utterance assumes that the concepts are known; storing the predictions in an individual user model for the user; and giving, by the automated conversational system, the standard output utterance to the user when it is predicted that the user is familiar with the concepts, or a nonstandard output utterance when it is it is predicted that the user is unfamiliar with at least one of the concepts.

A more complete understanding of the present invention, as well as further features and advantages of the present invention, will be obtained by reference to the following detailed description and drawings.

DETAILED DESCRIPTION OF PREFERRED EMBODIMENTS

Figure 1:
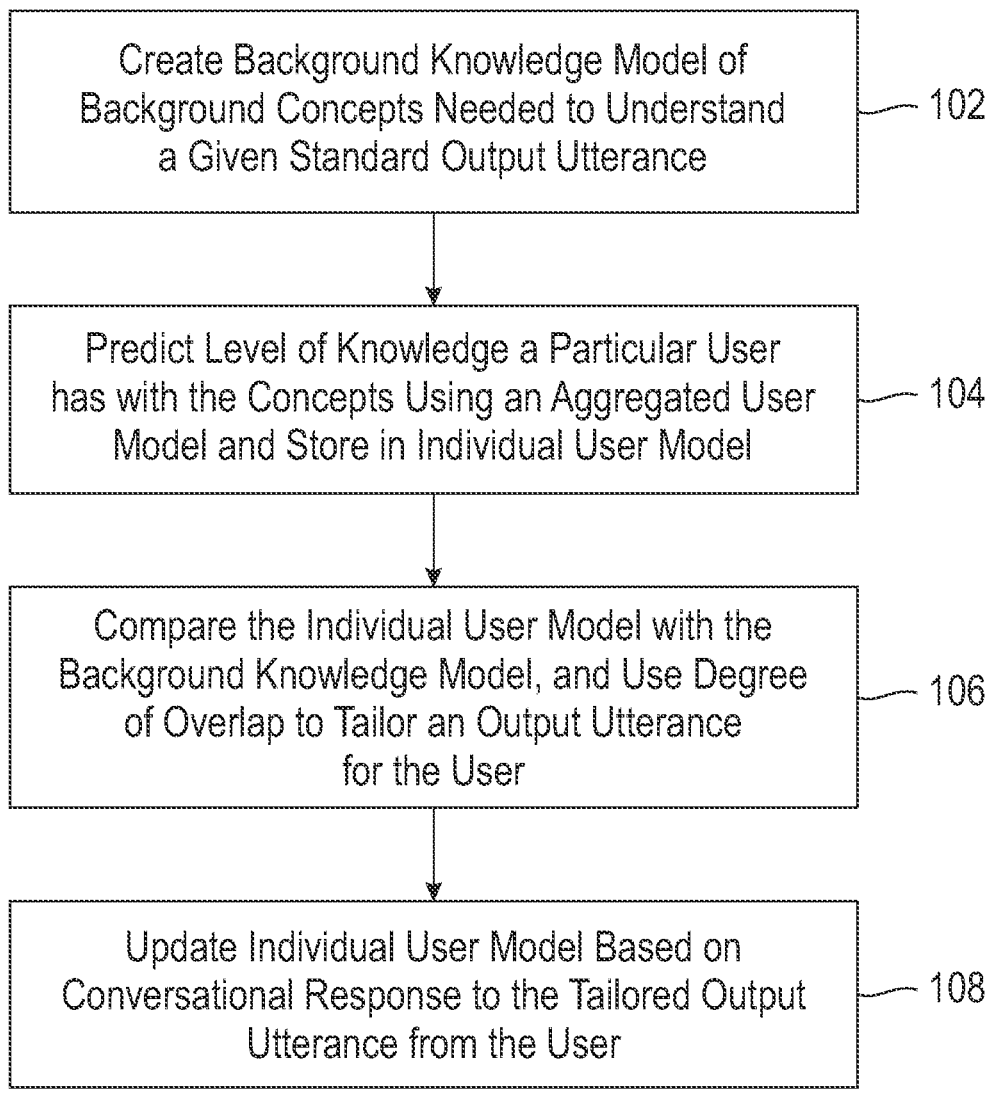
FIG. 1 is a diagram illustrating an exemplary methodology for personalizing an automated conversational system according to an embodiment of the present invention.

With human conversation, speakers tailor what they say based on what they think the person they are talking to knows or does not know about the topic of conversation. Speakers will adjust what they say throughout the conversation such as providing more or less explanation depending on the responses they get. For instance, if a person is speaking to another person about a health topic, and learns through the course of the conversation that the other person is a medical doctor, then the speaker might eliminate discussing the details a medical is assumed to know.

However, as provided above, this feature of human conversation (referred to herein as 'recipient design' where the form of an utterance is tailored for a particular recipient) is generally lacking in conversational artificial intelligence (AI). As a result, with conventional AI systems, utterances can be provided to users that are not well-tailored to the knowledge of the particular recipient, which can be harder for the recipient to understand.

Advantageously, provided herein are techniques for easily and effectively predicting the level of knowledge a user has on a particular topic relative to a body of background knowledge on the topic. Those predictions are then leveraged to personalize system utterances to that particular user. Since the user will be the recipient of those system utterances, the terms 'user' and 'recipient' may be used interchangeably herein.

The present techniques employ models to classify users based on their predicted level of knowledge on a subject. These models leverage data such as information from past interactions with a user (e.g., the user was unfamiliar with certain content, the user self-reports their knowledge level on a topic, etc.) and other relevant information such as general background knowledge on a topic.

As will be described in detail below, one of the models used in accordance with the present techniques is a background knowledge model. The background knowledge model represents a network of concepts that is needed to understand a standard output utterance (also referred to herein as 'background concepts'). The term 'output utterances' as used herein generally refers to outputs from an AI automated conversational system (also referred to herein as 'AI utterances'). The standard form of an output utterance (also referred to herein as a 'standard output utterance') is one that assumes the user knows the background concepts in question. For instance, in a conversation with a particular user about different Conversational AI products available for the user, the present system might start the with the standard output utterance "Want to use Natural Language Processing?" if the assumption is made that the user is familiar with the background concept of 'Natural Language Processing.' As will be described in detail below, this assumption is made based on the notion that if an aggregate of users knows what 'Natural Language Processing is then this particular user is likely to know it as well.

By contrast, the nonstandard form of an output utterance (also referred to herein as a 'nonstandard output utterance') is one that is tailored to include different terms and/or more details based on knowledge that a particular user is not familiar with some of the background concepts such as the concept of 'Natural Language Processing' in the current example. For instance, if the system predicts that a particular user is unfamiliar with that concept, then the initial reference to that concept will be formulated as something like, "Want to use an AI service for natural language processing?" or like, "Want to use Natural Language Processing? It's an AI service that basically classifies phrases and sentences." In other words, the system will not use the name alone, as in the standard output utterance, but will use a description of the concept or the name with the description. Thus, the present AI automated conversational system provides output utterances to a particular user, which can be standard or nonstandard output utterances, but which are tailored to the particular use based on the familiarity of the user with the background concepts. Furthermore, the present AI automated conversational system will take into account that this particular user now knows what 'Natural Language Processing' is, and can leverage that information for future interactions.

Another one of the models used in accordance with the present techniques is an aggregated user model. The aggregated user model is a probabilistic graphical machine learning model such as a Bayesian Network that represents the probabilistic relationships between different concepts based on all users, i.e., the aggregated user model is a global user model. A Bayesian Network is a probabilistic graphical model for representing knowledge about an uncertain domain. A Bayesian Network typically includes multiple nodes representing random variables. Edges interconnecting the nodes represent the probability for the respective random variables.

As will be described in detail below, the aggregated user model is used to predict an individual user model which is another one of the models used in accordance with the present techniques. The individual user model stores internal information about what a particular user knows or does not know about the background concepts in question including information garnered from past interactions with that user. Additionally, a user might self-report their level of knowledge on different concepts. As will be described in detail below, each individual user model is updated based on conversations the system has with each of the users. Thus, if a particular user was unfamiliar with certain content (e.g., the user did not know what 'Natural Language Processing' is), then the individual user model for that particular user stores that information.

As highlighted above, the aggregated user model is a probabilistic graphical machine learning model such as a Bayesian Network. The probabilities in a Bayesian Network are conditional, meaning that the probability that the user knows a concept in question depends on how many related concepts the user knows. As will be described in detail below, this determination of how many related concepts the user knows will be determined by comparing the individual user model for the user with the background knowledge model.

An overview of the present techniques is now provided by way of reference to methodology 100 of FIG. 1 for personalizing an automated conversational system. A goal of methodology 100 is to provide an output utterance that is suited to the knowledge-level of the background concepts in question predicted for a particular user. Based on the prediction, the output utterance that will ultimately be provided to the user (see step 108—described below) can be a standard output utterance (if by methodology 100 it is predicted that the user is familiar with the background concepts in question) or a nonstandard output utterance (if by methodology 100 it is predicted that the user is not familiar with some of the background concepts in question). Thus, to begin the analysis, a given standard output utterance is evaluated. Namely, in step 102, a background knowledge model (see above) is created for the given standard output utterance. As provided above, the background knowledge model is a network of the background concepts needed to understand the standard output utterance. According to an exemplary embodiment, the background knowledge model is built by connecting the concepts in the same category using a publicly-available knowledge data base or knowledge graph. Concepts are extracted from the standard output utterances and matched against those in the knowledge graph. The sub-graph that includes those extracted concepts, and their higher-level concepts in the ontology, is then used as the background knowledge model against which individual user models will be compared.

Figure 2:
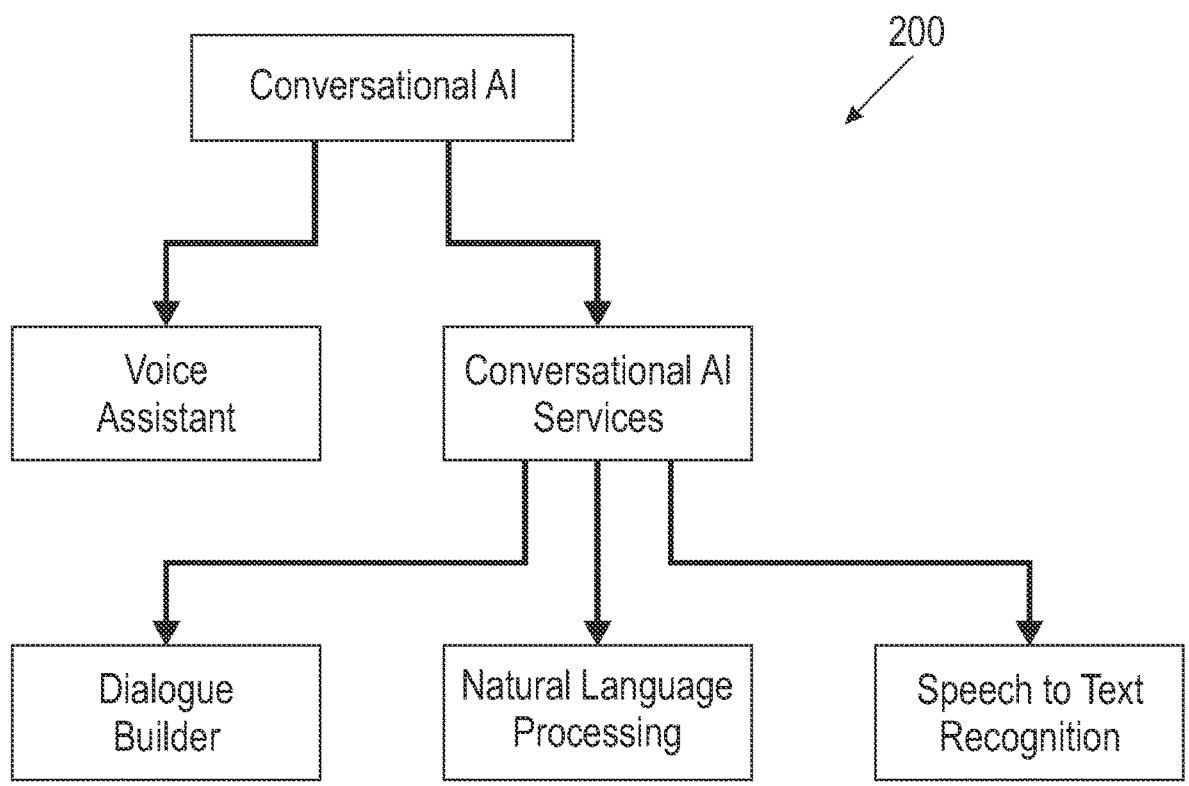
FIG. 2 is a diagram illustrating an exemplary background knowledge model according to an embodiment of the present invention.

For instance, by way of example only, if the topic of conversation is about 'Conversational AI Services' and the standard output utterance evaluated in step 102 is "I recommend a Dialogue Builder," then a background knowledge model such as exemplary background knowledge model 200 shown in FIG. 2 may be created for this particular topic of conversation. Namely, in order to engage in a conversation on the topic of 'Conversational AI' one generally needs to have knowledge of the related background concepts such as that of the types of services available including 'Voice Assistant,' 'Conversational AI Services' and those services under the umbrella of 'Conversational AI Services' such as 'Dialogue Builder,' 'Natural Language Processing,' and 'Speech To Text Recognition.'

In step 104, a familiarity of the particular user with the concepts in the background knowledge model is predicted. According to an exemplary embodiment, an aggregated user model (see above) is used to predict the familiarity of the particular user with the concepts in the background knowledge model. As provided above, the aggregated user model is a probabilistic graphical model (e.g., a Bayesian Network) that represents the probabilistic relationships between the different background concepts based on all users, i.e., it is a global user model.

Figure 3:
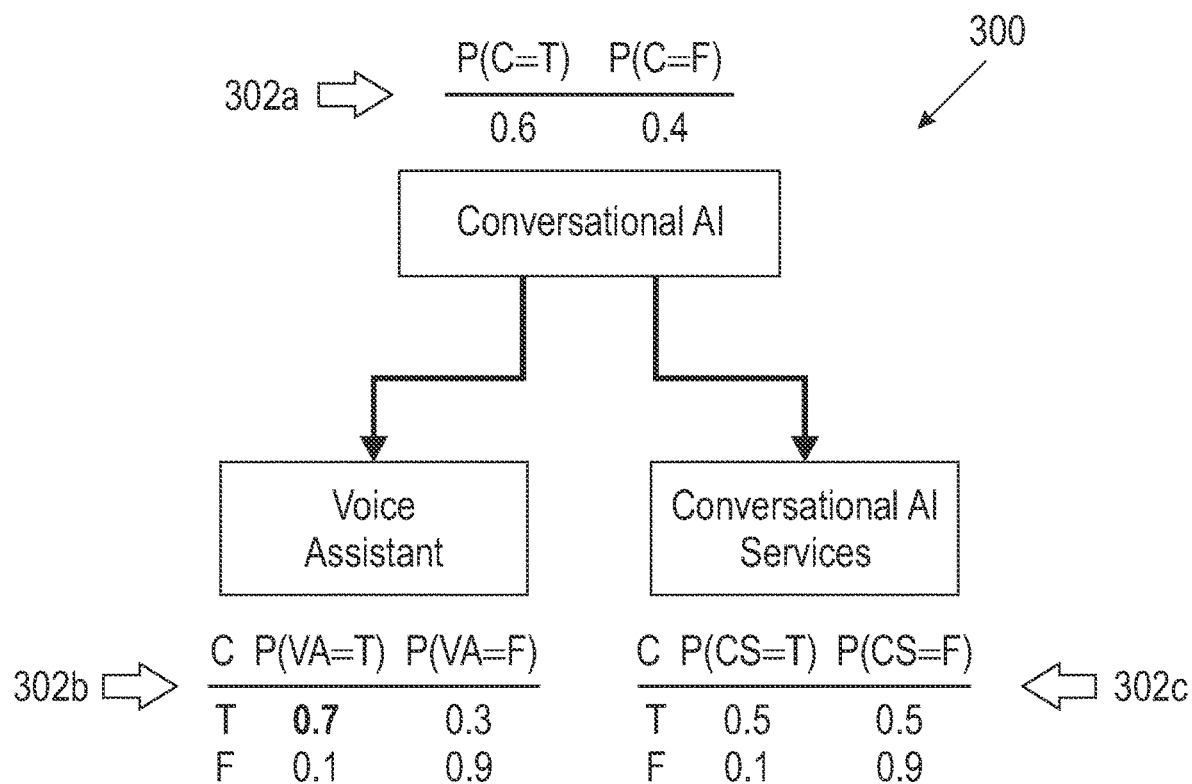
FIG. 3 is a diagram illustrating an exemplary aggregated user model according to an embodiment of the present invention.

For instance, again using the example where the topic of conversation is about 'Conversational AI Services,' data from an aggregate of users is combined into a global user model such as exemplary aggregated user model 300 (e.g., a Bayesian Network) shown in FIG. 3. In this case, the background concepts involve available products including 'Voice Assistant' and 'Conversational AI Services.' The nodes in aggregated user model 300, i.e., 'Conversational AI,' 'Voice Assistant,' 'Conversational AI Services,' etc. represent random variables. Each of these random variables has one of two values T or F, representing True or False, respectively. Conditional probability tables 302a, 302b and 302c are shown next to their respective nodes 'Conversational AI,' 'Voice Assistant' and 'Conversational AI Services,' respectively, where C='Conversational AI,' VA='Voice Assistant,' and CS='Conversational AI Services.' Namely, when a concept is dependent on more than two background concepts, the conditional probability of two events occurring together is calculated. For example, from aggregated user model 300 (FIG. 3) it is assumed that 'Voice Assistant' depends not only on 'Conversational AI' but also on 'Conversational AI Services.' In that case, the distribution over 'Voice Assistant' is a conditional distribution P(VA|C, CS). P(VA|C, CS) can be calculated by dividing the joint probability of VA, C, CS (e.g., P(VA, C, CS) by the joint probability of C, CS (e.g., P(C, CS)).

The aggregated user model 300 (i.e., based on an aggregate of users) is then used to predict the familiarity of one particular user (who is a party to the conversation with the automated conversational system) with these products such as 'Voice Assistant' and 'Conversational AI Services.' By 'familiarity' it is meant simply whether (or not) the user knows about (i.e., is familiar) with a particular concept. So, for instance, if a particular user has used 'Conversational AI Services' in the past, then that user is considered to be familiar with 'Conversational AI Services,' but may or may not be familiar with each of the related products/concepts such as 'Dialogue Builder,' 'Natural Language Processing,' and 'Speech To Text Recognition' under the 'Conversational AI Services' umbrella.

Figure 4:
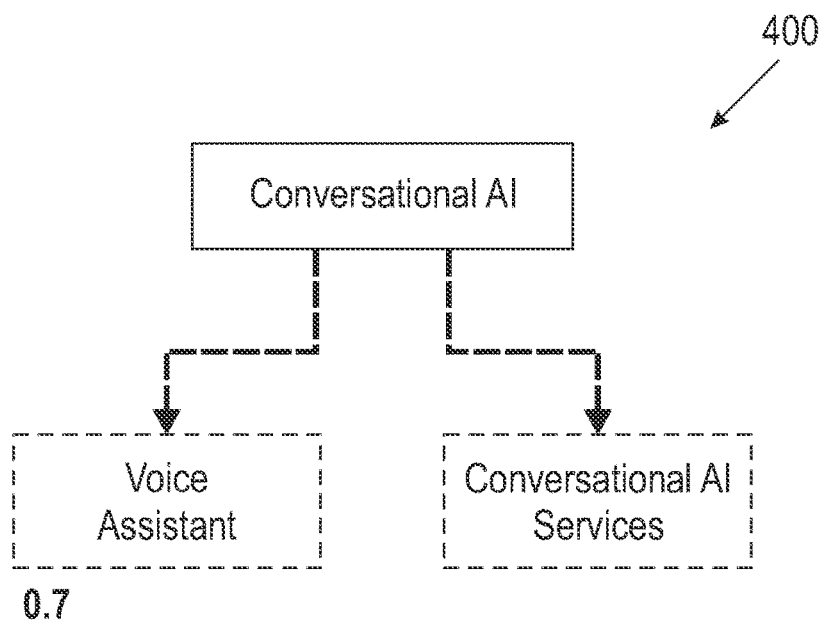
FIG. 4 is a diagram illustrating an exemplary individual user model according to an embodiment of the present invention.

As highlighted above, the notion here is that if an aggregate of users knows what a particular background concept is then this particular user is more likely than not to know it as well. An example illustrating this process is provided in FIGS. 5 and 6, described below. The predicted familiarity of a particular user with these concepts is then stored in an individual user model (see above) for that user. As provided above, the individual user model stores internal information about what a particular user knows or does not know about certain background concepts. Thus, this information includes the predictions made in step 106. For instance, an exemplary individual user model 400 is shown in FIG. 4. In this particular example, based on the background knowledge of an aggregate of users gleaned, e.g., from aggregated user model 300 (FIG. 3), there is assumed to be a 70% chance that the user associated with individual user model 400 (FIG. 4) is familiar with the concept of 'Voice Assistant' given that the user knows 'Conversational AI.' It is notable that updates will be made to the individual user model over time. For instance, as will be described in detail below, if the present automated conversational system provides the user with a definition of a given background concept, then the individual user model for that particular user will be updated to reflect that the user likely now knows that concept. Thus, the example depicted in FIG. 4 is generally representative of the case where the prediction is made based on the user's background knowledge (e.g., 'Conversational AI') and an aggregate of the users from FIG. 3.

As described above, the prediction might turn out to be wrong, and the user is not in fact familiar with the background concept(s) in question. This will prompt the present automated conversational system to update the individual user model for the user to indicate that the user does not know the background concept(s) in question. As provided above, the individual user model stores information about what the user already knows or does not know. Further updates to the individual user model can be made based on subsequent interactions. For instance, using the example above merely as an illustration, if the present automated conversational system assumes that the user knows what 'Natural Language Processing' is based on the aggregate user model indicating that most users know what it is, then the present automated conversational system may start with the standard output utterance "Want to use Natural Language Processing?" However, if it turns out that this user does not know what 'Natural Language Processing' is based, for example, on the fact that the user requests a definition by replying "what's that?", then the prediction is wrong. The individual user model for this user is then updated to indicate that this user does not know the background concept 'Natural Language Processing.'

The present automated conversational system can then provide the requested definition with the nonstandard output utterance "It's an AI service that basically classifies phrases and sentences." The present automated conversational system will then update the individual user model for this model to indicate that the user now likely knows the background concept 'Natural Language Processing' since the user received a definition of it.

In step 106, the individual user model for the particular user is then compared with the background knowledge model, and the degree of overlap between these models is used to calculate joint probability and to tailor an output utterance for the particular user. As will be described in detail below, the degree of overlap refers to the number of related concepts the particular user knows. This is where the background knowledge model is used. Namely, the present automated conversational system will use the background knowledge model to retrieve other background concepts that are related to the concept(s) in the standard output utterance (also referred to herein as 'related concepts'). For instance, using a similar example as above, if the standard output utterance is "Want to use Conversational AI Services?", then the present automated conversational system can use the background knowledge model 200 (FIG. 2) to retrieve the background concept of 'Voice Assistant' that is related to the concept of 'Conversational AI Services' in the standard output utterance.

The present automated conversational system then checks to see how many of these related concepts the particular user knows. This is where the individual user model for that particular user is employed. Namely, referring to the individual user model 400 shown in FIG. 4, it can be seen that in this particular example there is a 70% chance that the user is familiar with the related concept of 'Voice Assistant.' Namely, this particular user is more likely than not to know about 'Voice Assistant' given that the user knows 'Conversational AI' if the threshold is higher than 70%. It is notable that, in this example 'Conversational AI Services' is not dependent on 'Voice Assistant' (no conditional probability) but is dependent on 'Conversational AI.'

As provided above, the goal ultimately is to provide an output utterance (standard or nonstandard) to the user that the user is likely to understand. The process began with a standard output utterance. Based on the analysis performed in steps 104-106 above, if it is predicted that the user is, e.g., more likely than not, to know about the background concepts in the standard output utterance, then the present automated conversational system will provide the standard output utterance to the user in step 106. Again, using the exemplary conversation from above related to conversational AI products, if the above analysis predicts that the user is likely to be familiar with the concept of 'Natural Language Processing,' then the present automated conversational system might provide a standard output utterance such as "Want to use Natural Language Processing?" to the user in step 106.

On the other hand, if the analysis reveals that the user is likely not to know about a concept(s) in the standard output utterance, then the present automated conversational system will provide a nonstandard output utterance that is tailored to the background knowledge-level of the user in step 106. For instance, by way of example only, the nonstandard output utterance can include a definition of the concepts that the user is unlikely to know. For example, if the above analysis predicts that the user is unlikely to be familiar with the concept of 'Natural Language Processing,' then the present automated conversational system might provide a nonstandard output utterance that includes a definition of that concept such as "Want to use Natural Language Processing? It's an AI service that basically classifies phrases and sentences" to the user in step 106. Thus, the output utterance provided to the user in step 106 (whether it be a standard or nonstandard output utterance) is tailored to the knowledge-level of the user regarding the background concepts in question (also referred to herein as a 'tailored output utterance').

Upon receiving a conversational response to the tailored output utterance from the user, in step 108 the present automated conversational system will update the individual user model for the user accordingly. For instance, again using the exemplary conversation from above related to conversational AI products, if the tailored output utterance to the user is "Want to use Natural Language Processing?", then the assumption is made that the user is likely to know the concept of 'Natural Language Processing.' However, if the conversational response from the user is "what's that?", then the present automated conversational system in step 108 will update the individual user model for the user to indicate that the user is not familiar with the concept of 'Natural Language Processing.' As described above, if in response the system provides the user with a definition of 'Natural Language Processing,' then the individual user model for the user will again be updated to indicate that the user now likely knows this concept.

Figure 5:
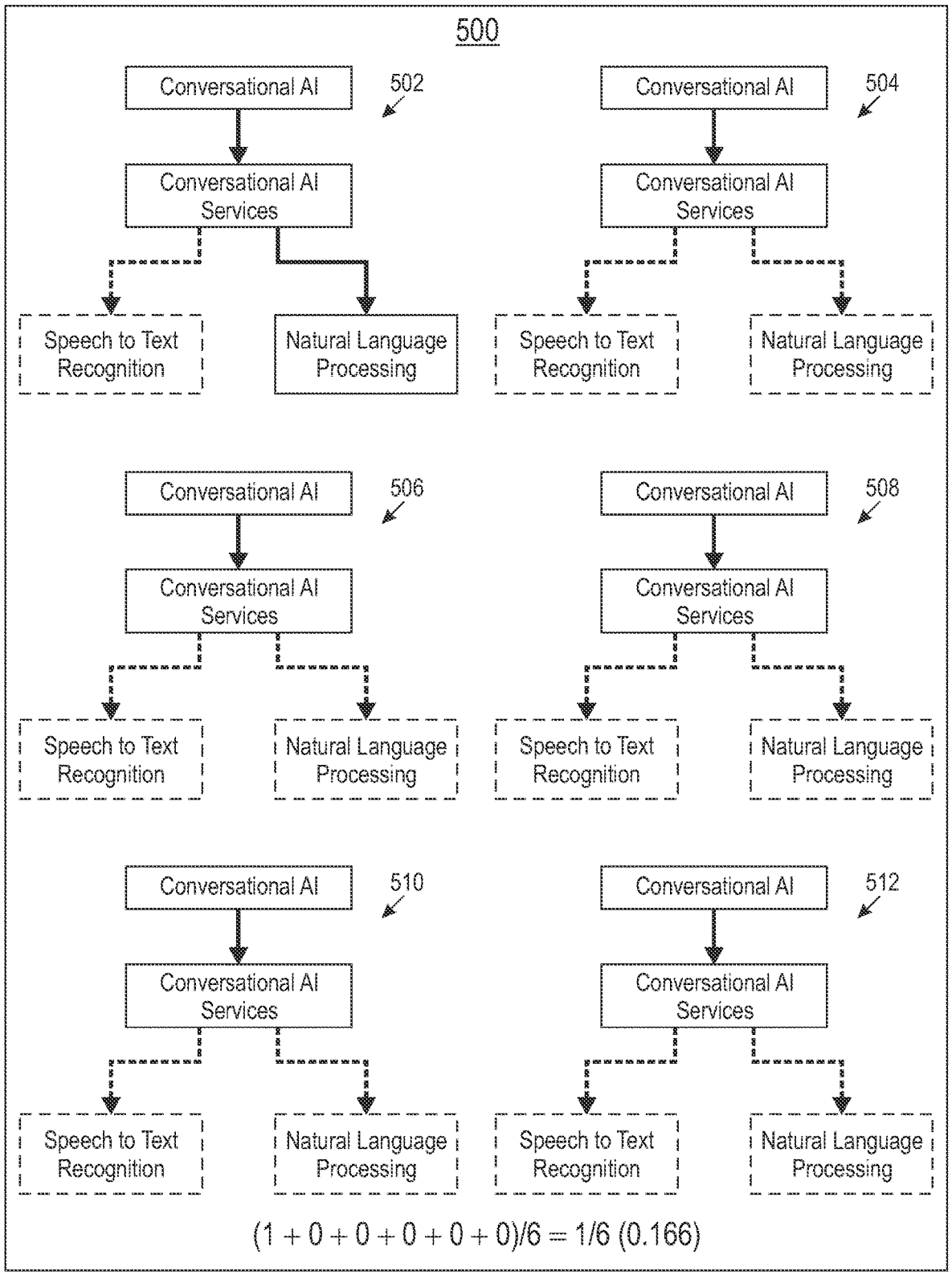
FIG. 5 is a diagram illustrating knowledge data from an exemplary aggregate of users according to an embodiment of the present invention.
Figure 6:
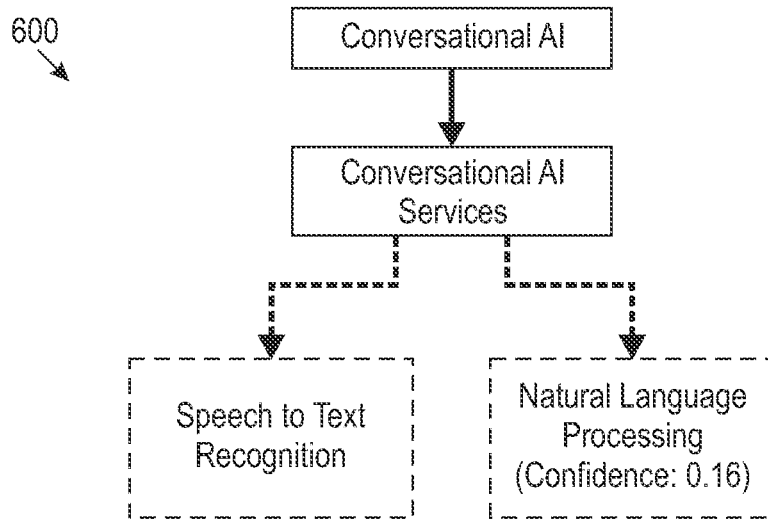
FIG. 6 is a diagram illustrating an individual user model with predictions based on the aggregate of users according to an embodiment of the present invention.

Reference is now made to a non-limiting example that employs the above-described techniques. As provided above, data from an aggregate of users is leveraged to predict the familiarity of a particular user with the background concepts needed to understand a standard output utterance. Thus, referring for example to FIG. 5, the data from an aggregate 500 of users is shown. Specifically, FIG. 5 schematically depicts the individual user models 502, 504, 506, 508, 510 and 512 obtained for each of six past users. Solid and dashed lines are used to denote what background concepts each user is or is not familiar with, respectively. For illustrative purposes only, in this particular example, each of the six past users is familiar with the concepts of 'Conversational AI' and 'Conversational AI Services.' However, only one of the six past users is familiar with the concept of 'Natural Language Processing.' See individual user model 502. Therefore, that creates the expectation that for any next user for whom data is not yet available, that user will be given a 1 in 6 probability (i.e., is less likely than not) of being familiar with the concept of 'Natural Language Processing.' As such, it is assumed that the user will not know the concept, and that information is stored in the individual user model for that particular user. See, for example, individual user model 600 in FIG. 6 which is updated to indicate that the user is likely to be unfamiliar with the concept of 'Natural Language Processing.' As above, solid and dashed lines are used in FIG. 6 to denote what background concepts the user is or is not familiar with, respectively.

On the other hand, consider a different scenario (not illustrated in the figures) where there is instead a 5 in 6 chance of the user recognizing the concept. In that case, it is more likely than not that the user would be familiar with the concept of 'Natural Language Processing.' As such, it would be assumed that the user will know the concept. The terms 'more likely than not' or 'less likely than not' as used herein refer to the scenarios where there is more than a 50% chance or less than a 50% chance, respectively, that the user will be familiar with the concept(s) in question. It is notable, however, that any likely/unlikely threshold can be set in accordance with the present techniques.

As described above, a degree of overlap between the individual user model and the background knowledge model is then used to tailor an output utterance given to the user. For instance, if the output utterance is "Want to use Watson Natural Language Processing?" the present automated conversational system first uses the background knowledge model to retrieve other concepts (e.g., 'Dialogue Builder,' 'Speech To Text Recognition,' etc.) related to the concept in the output utterance (e.g., 'Natural Language Processing') (also referred to herein as 'related concepts'). The system then checks to see how many of the related concepts the user already knows.

As provided above, a user's familiarity with a background concept in question is predicted using the aggregated user model which is a probabilistic graphical model such as a Bayesian Network with the data from an aggregate of users. The present example involves three users, i.e., User 1, User 2 and User 3. In this scenario, the system does not yet have any data on User 1, thus it is unknown what User 1 is familiar with. Further, based on the aggregated user model, it is known that User 2 is familiar with 'Dialogue Builder,' and that User 3 is familiar with both 'Dialogue Builder' and 'Speech To Text Recognition.' The probabilities in a Bayesian Network are conditional, meaning in this case that the probability depends on how many related concepts the user in question knows.

Thus, for User 1 (no condition), since there is no known background knowledge data for this user, the probability that the user knows a concept in question is derived from all past users (e.g., a ⅙ chance User 1 is familiar with 'Natural Language Processing' as in the example shown in FIG. 5). However, for User 2 the condition is "the user knows 'Dialogue Builder.' Thus, in that case, the probability that User 2 knows 'Natural Language Processing' is not derived from all past users, but instead from "the users who know 'Dialogue Builder' know 'Natural Language Processing' (which will be higher than 1/6). Namely, User 1 uses non-conditional probability, whereas User 2 uses conditional probability, i.e., the probability that event X will occur given that event Y has already occurred (in this case, the probability that 'Natural Language Processing' will occur (will be known) given that 'Dialogue Builder' has already occurred (is known)). In a similar manner, User 3 also uses the probability derived from "the users who know 'Dialogue Builder' and 'Speech To Text Recognition' know 'Natural Language Processing.' Therefore, the degree of overlap between the individual user model and the background knowledge model refers to how many related concepts the user already knows.

Based on the degree of overlap, an output utterance tailored to the particular user is then given by the system. For instance, using User 1 as an example, given the ⅙ chance it is then unlikely that User 1 will be familiar with 'Natural Language Processing.' In that case, the system will give a nonstandard output utterance, e.g., including a definition of 'Natural Language Processing,' since a standard output utterance would assume that the user knows the background concepts in question.

Figure 7:
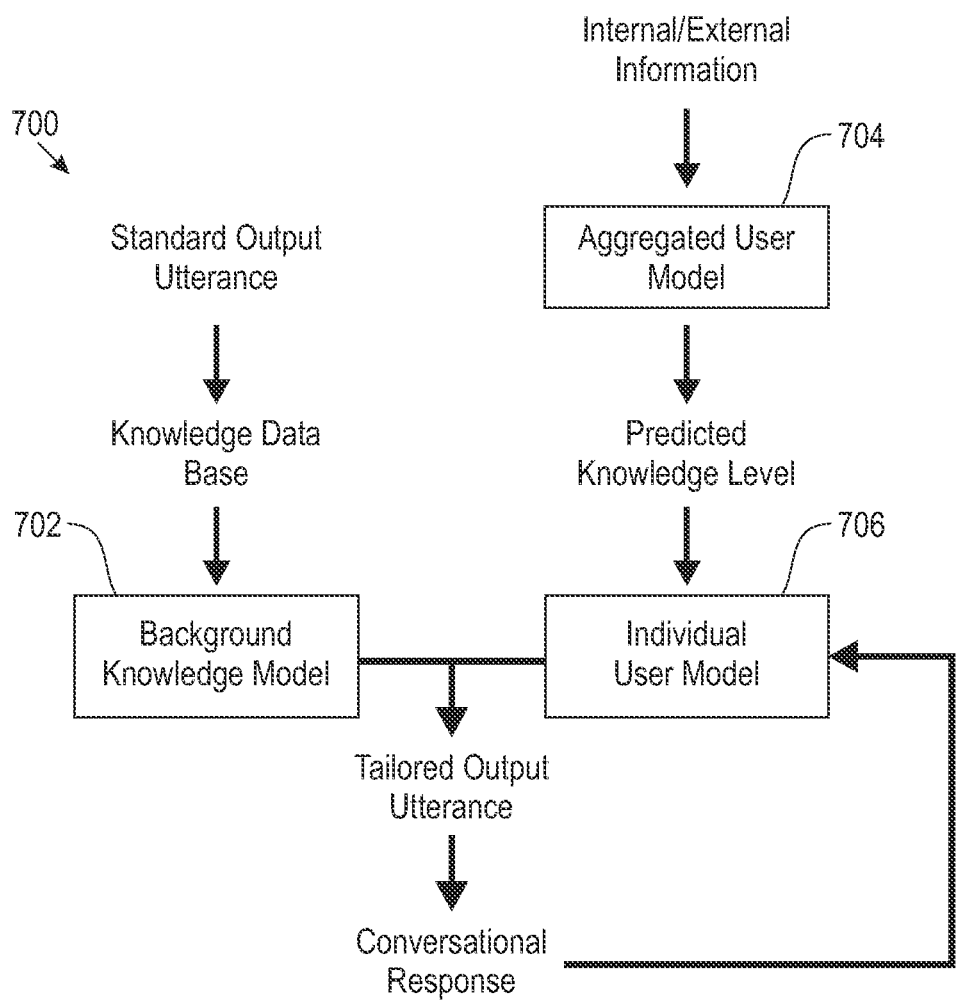
FIG. 7 is a diagram illustrating an exemplary automated conversational system according to an embodiment of the present invention.

An exemplary automated conversational system 700 in accordance with the present techniques is shown illustrated in FIG. 7. Automated conversational system 700 can be embodied in an apparatus such as apparatus 1300 described in conjunction with the description of FIG. 13 below.

As shown in FIG. 7, automated conversational system 700 has a Background Knowledge Model component 702 that uses publicly-available knowledge (Knowledge Data Base) to build a background knowledge model of the background concepts needed to understand a standard output utterance. As provided above, a standard output utterance is one that assumes that these background concepts are known.

Automated conversational system 700 also has an Aggregate User Model component 704 that leverages internal and/or external information about the user (if available) and knowledge-level data gleaned from an aggregate of users to predict a knowledge level (i.e., familiarity) of the user with the background concepts. Internal information refers to data obtained from past interactions with the user. For instance, if the user has been provided with the definition of a concept in the past, then it is assumed that the user is likely now familiar with that concept. Thus, for a first-time user where no internal information is available, the predictions are made based on an aggregate of other users. However, as the user interacts with the system, more pointed predictions can be made. For instance, as provided in the examples above, once the user knows a concept, then the predictions can be based on an aggregate of users that also know that concept. External information refers to any other data provided by the user that indicates a familiarity of the user with the concepts in question. For instance, the user might self-report their knowledge level on a topic, or provide other relevant information such as general background knowledge on a topic. Or the system may use the user's location (e.g., New York City) to make the assumption that the user is knowledgeable about the concepts, Empire State Building, Brooklyn Bridge and other New York City landmarks.

According to an exemplary embodiment, the Aggregate User Model component 704 predicts whether the user is familiar or is not familiar with the concept(s) in question. An Individual User Model component 706 of automated conversational system 700 then stores that information in an individual user model for the particular user.

Automated conversational system 700 then compares the user's knowledge from the individual user model with the background knowledge from the background knowledge model, and the overlap between the two is used to tailor an output utterance to the user (see Tailored Output Utterance). The degree of overlap refers to how many of the related concepts the user knows. Namely, as provided above, the aggregated user model is a probabilistic graphical model such as a Bayesian Network. With a Bayesian Network the probabilities are conditional, whereby the probability that the user knows a concept in question depends on how many related concepts the user knows.

The user's Conversational Response to the Tailored Output Utterance is then used by the Individual User Model component 706 to update the individual user model for the user. For instance, by way of example only, if the Conversational Response from the user to the Tailored Output Utterance is "what's that?" then the Individual User Model component 706 may update the individual user model for the user to indicate that the user is not familiar with the concept in question.

The present techniques are now further described by way of reference to the following non-limiting examples. Consider, for instance, the following conversation that includes output utterances by the present AI automated conversational system (labeled "AI") and corresponding conversational responses from a user (labeled "User"):

AI: I recommend using Dialogue Builder!
User: uh-huh
AI: It will enable you to interact with your customers!
User: ok
AI: Natural Language Processing handles text inputs.
User: uh-huh
AI: And Speech To Text Recognition handles voice inputs.

Figure 8:
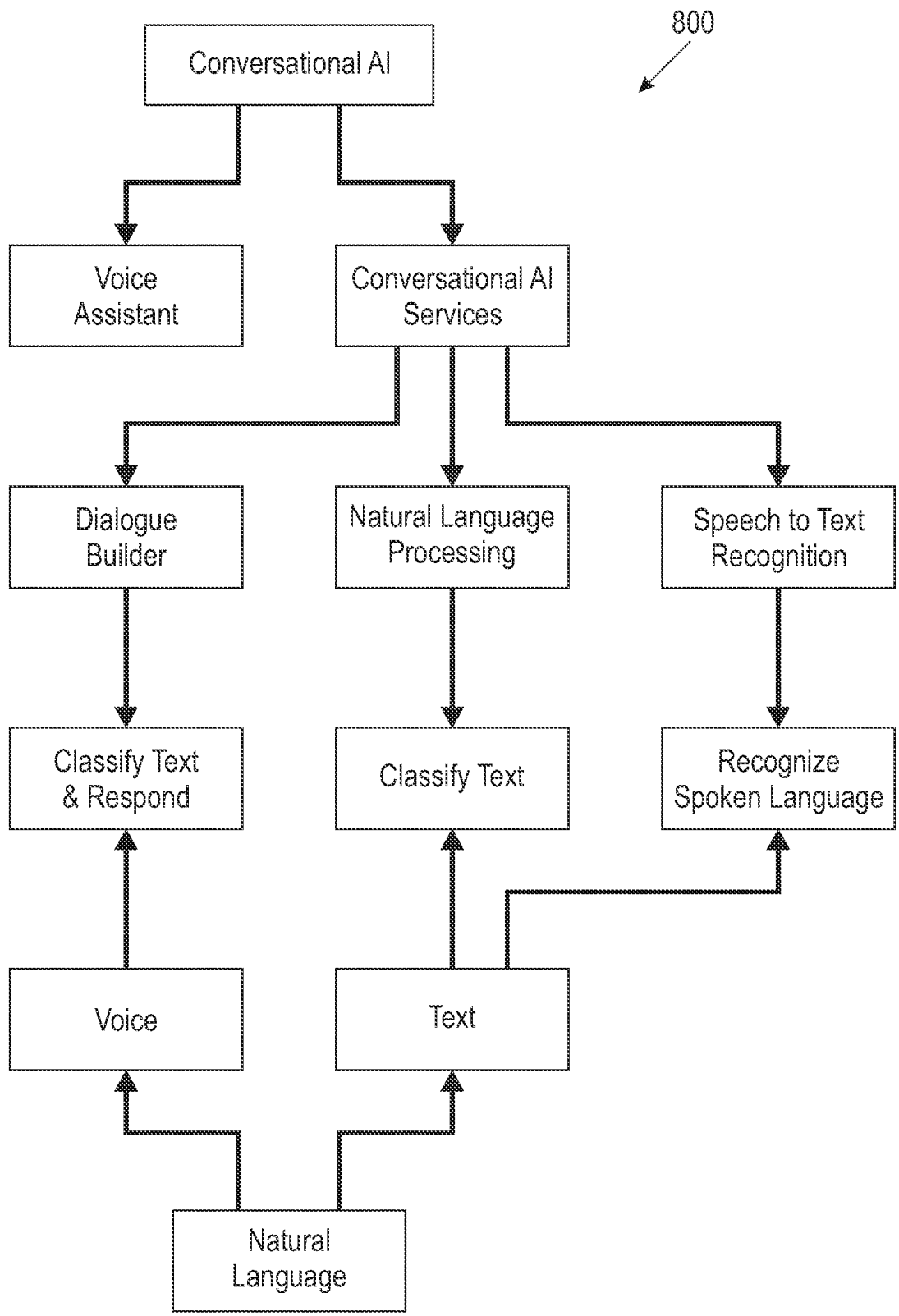
FIG. 8 is a diagram illustrating a background knowledge model for exemplary output utterances according to an embodiment of the present invention.

FIG. 8 provides a background knowledge model 800 of the background concepts needed to understand these output utterances. Notably, these output utterances assume that the user is familiar with the background concept of 'Dialogue Builder' and related concepts such as 'Natural Language Processing' and 'Speech To Text Recognition.' As provided above, this is what is referred herein as standard output utterances. It is noted that a conversation is made up of multiple output utterances by the AI automated conversational system and user utterances. Each utterance by the AI automated conversational system may be in the standard form or in a nonstandard/tailored form. In this example, the background concepts 'voice,' 'text,' 'classify text & respond,' etc. are concepts of what each Conversational AI Service does. For instance, a user may know the name of something, but not know what it does. Or the user may know both the name and what it does.

Figure 9:
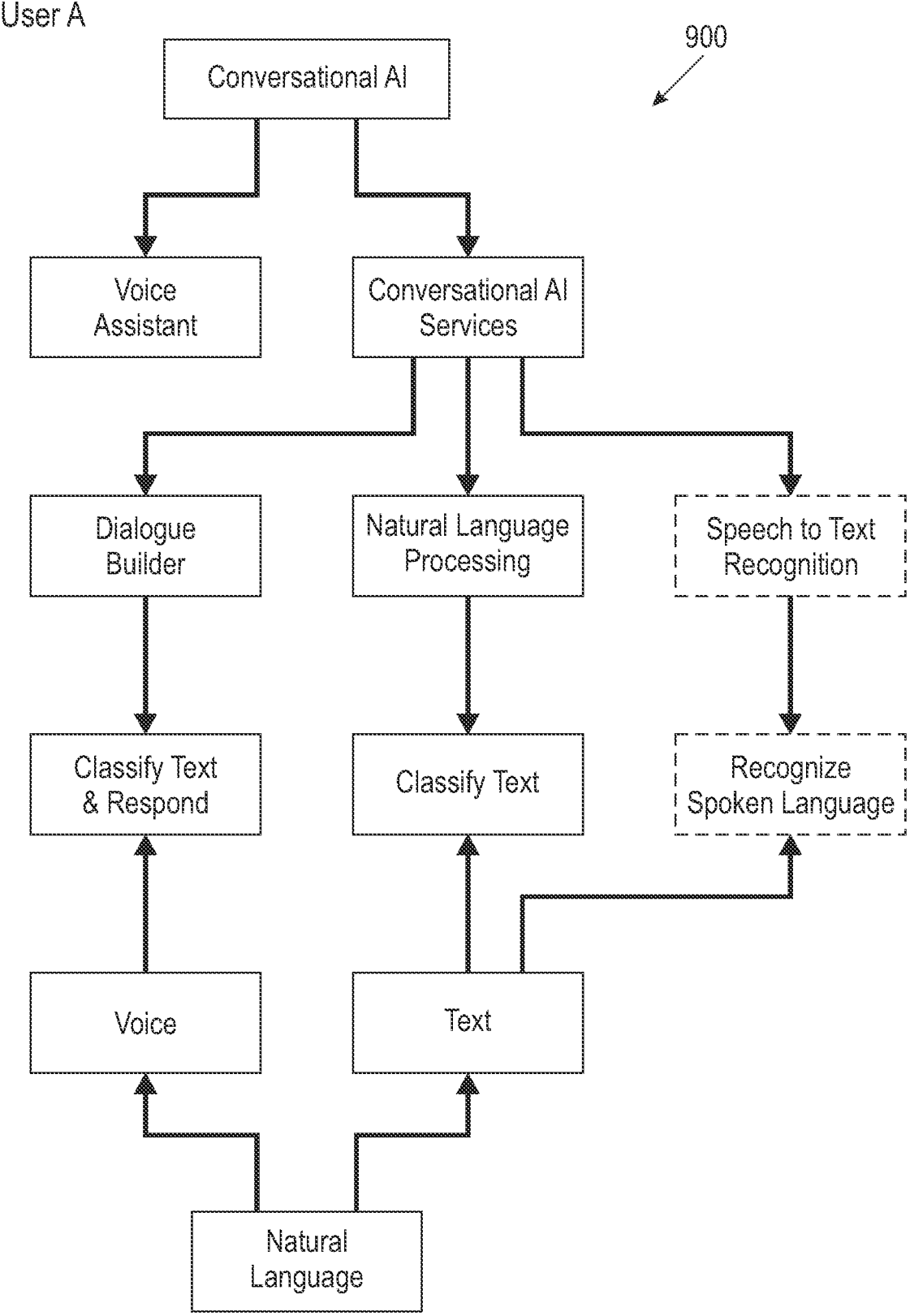
FIG. 9 is a diagram illustrating an individual user model for a User A according to an embodiment of the present invention.

Based on the above-described analysis, it may be predicted that a particular user (User A in this example) is in fact unfamiliar with the background concept of 'Speech To Text Recognition.' See, for example, the individual user model 900 of User A shown in FIG. 9. Solid and dashed lines are used to denote what background concepts User A is or is not familiar with, respectively. In that case, the system may tailor the output utterances to User A to include a definition of 'Speech To Text Recognition':

AI: I recommend using Dialogue Builder!
User A: uh-huh
AI: It will enable you to interact with your customers!
User A: ok
AI: Natural Language Processing handles text inputs.
User A: uh-huh
AI: And Speech To Text Recognition recognizes spoken language. ((tailored utterance)) As provided above, this is considered to be a nonstandard output utterance since User A is predicted to be unfamiliar with at least one of the background concepts in question, in this case 'Speech To Text Recognition'.

Figure 10:
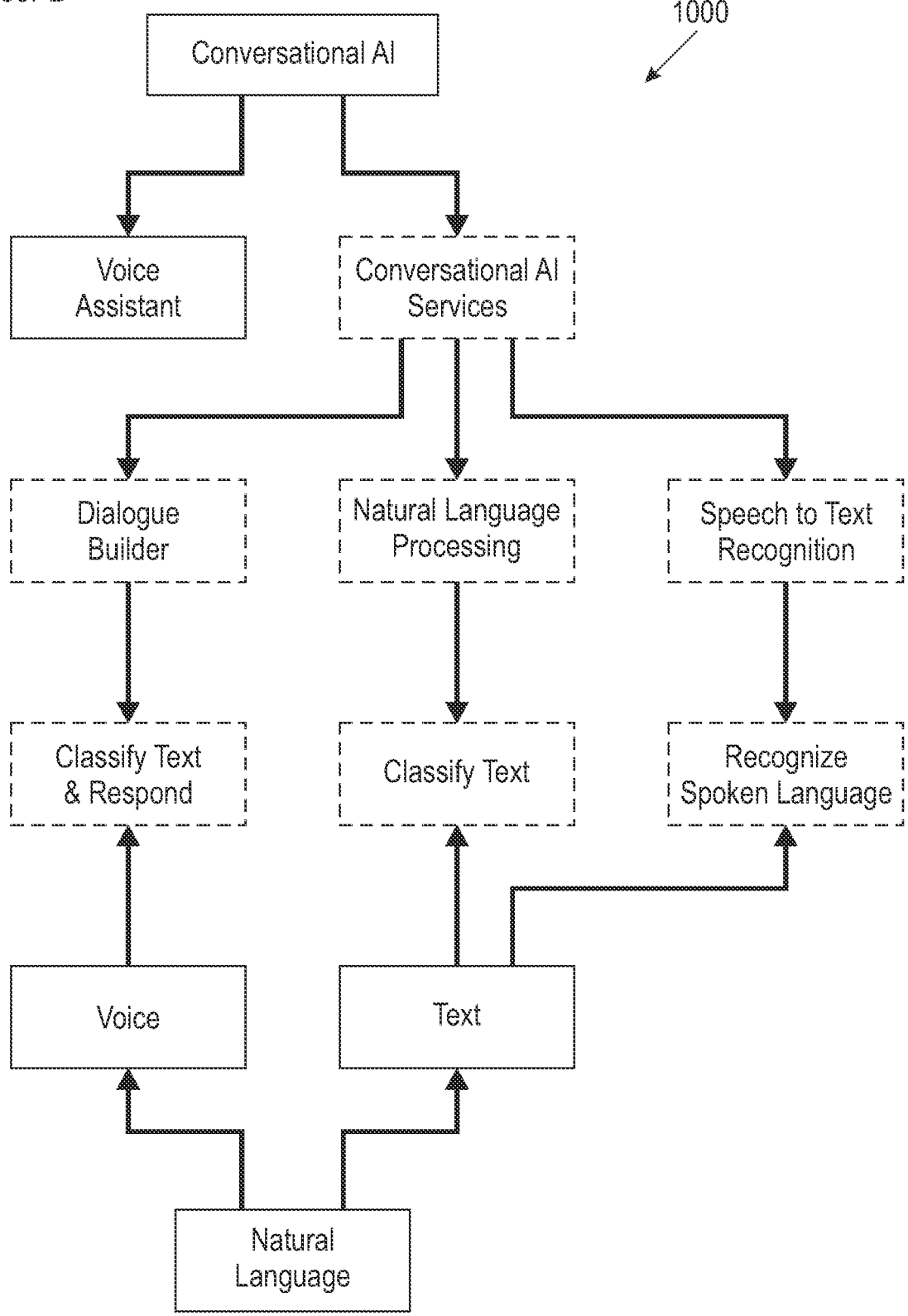
FIG. 10 is a diagram illustrating an individual user model for a User B according to an embodiment of the present invention.

For comparison, the predicted knowledge for a second user (User B) is shown in the individual user model 1000 for User B shown in FIG. 10. Again, solid and dashed lines are used to denote what background concepts User B is or is not familiar with, respectively. As shown in FIG. 10, it is predicted that User B is unfamiliar with the background concept of 'Conversational AI Services' and its related concepts of 'Dialogue Builder,' 'Natural Language Processing' and 'Speech To Text Recognition.' In that case, the system may tailor the output utterances to User B to include definitions of each of these unknown concepts:

AI: I recommend using Conversational AI Services!
User B: uh-huh
AI: Dialogue Builder will enable you to classify text inputs and respond to your customers!((tailored utterance))
User B: ok
AI: Natural Language Processing recognizes text inputs by classifying them. ((tailored utterance))
User B: uh-huh
AI: And Speech To Text Recognition recognizes spoken language. ((tailored utterance))

Figure 11:
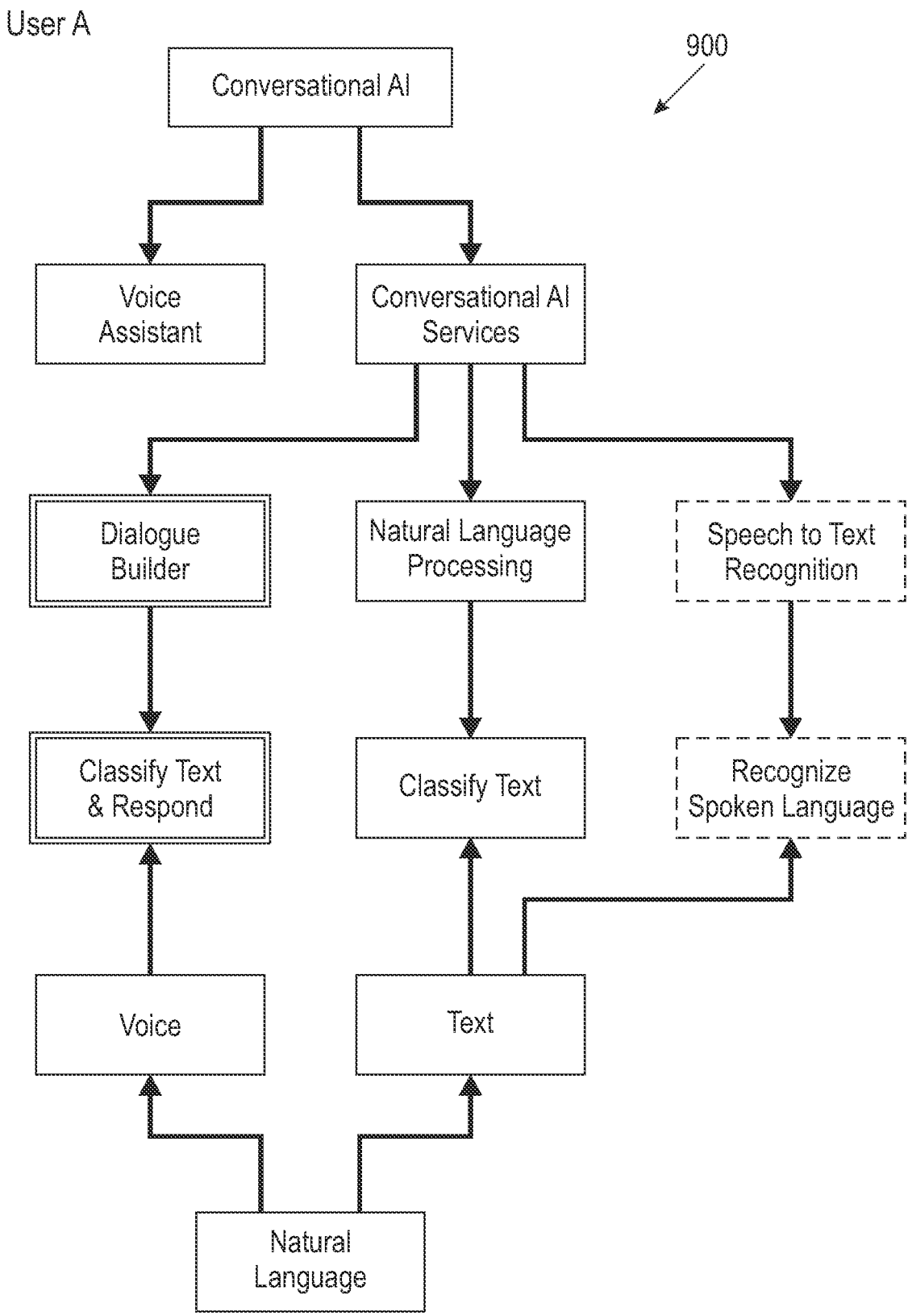
FIG. 11 is a diagram illustrating the individual user model for the User A having been updated based on the interactions of User A with the present automated conversational system according to an embodiment of the present invention.

As provided above, it may turn out that assumptions made about the users' knowledge of the background concepts are incorrect. In that case, the system will update the individual user model for the corresponding user to correct the false assumption(s). For instance, taking User A as an example, it was predicted that User A was likely familiar with the background concept of 'Dialogue Builder.' See, for example, the individual user model 900 in FIG. 9. However, based on the following conversation, the system learns that prediction was incorrect:

AI: I recommend using Dialogue Builder!
User A: what is Dialogue Builder? ((evidence of unfamiliarity))
AI: Oh! Dialogue Builder is a dialog service that enables you to classify text inputs and respond to your customers.
User A: oh ok The individual user model 900 for User A is then updated as shown in FIG. 11 to reflect the user's trouble in understanding the concept of 'Dialogue Builder' by removing that node (and the related nodes) from individual user model 900 for User A. Here, solid and dashed lines are used to denote what background concepts User A is or is not familiar with, respectively, and double outlines are used to denote the correction (in this case that the node 'Dialogue Builder' and related nodes have been removed).

Figures 12A, 12B:
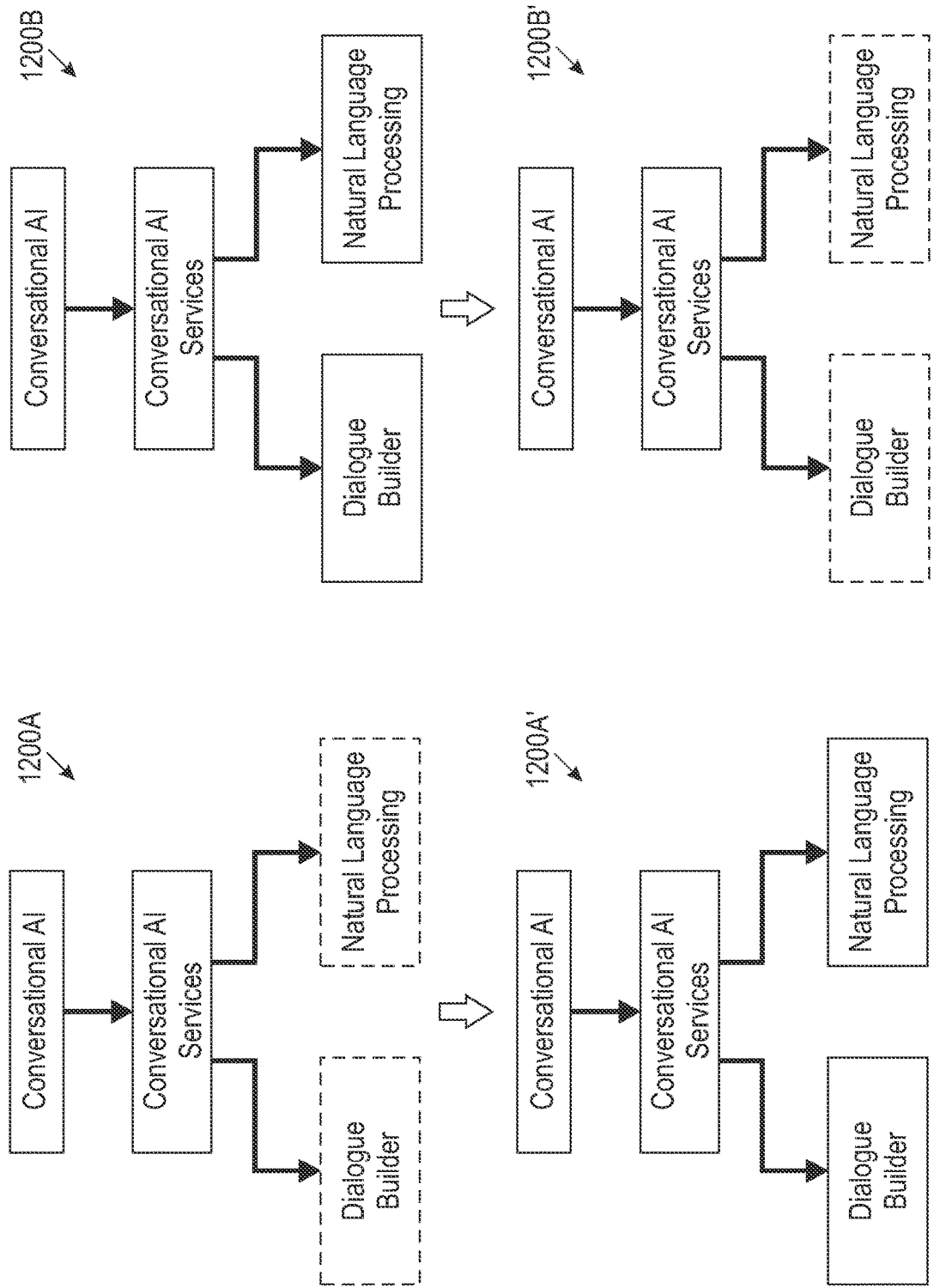
FIG. 12A is a diagram illustrating an exemplary unknown to known scenario according to an embodiment of the present invention.
FIG. 12B is a diagram illustrating an exemplary known to unknown scenario according to an embodiment of the present invention.

Another example illustrating how the individual user model for a user is updated based on interactions with the user, i.e., internal information, is now described by way of reference to FIGS. 12A and 12B. FIG. 12A illustrates an unknown to known scenario where it is predicted that the user is unfamiliar with the background concepts of 'Dialogue Builder' and 'Natural Language Processing.' See individual user model 1200A for the user. Again, solid and dashed lines are used to denote what background concepts the user is or is not familiar with, respectively. However, the system then has the following conversation with the user:

AI: Of the Conversational AI Services, you probably need Dialogue Builder!
User: I've used it before! ((evidence of familiarity))

Based on this conversation, the system learns that the prediction was wrong, and that the user is in fact familiar with the concepts in question. The system then updates the individual user model for that user accordingly. See the updated individual user model 1200A'.

FIG. 12B illustrates a different scenario (a known to unknown), namely one where it is predicted that the user is familiar with the background concepts of 'Dialogue Builder' and 'Natural Language Processing.' See individual user model 1200B for the user. Again, solid and dashed lines are used to denote what background concepts the user is or is not familiar with, respectively. However, the system then has the following conversation with the user:

AI: Of the Conversational AI Services, you probably need Dialogue Builder!
User: What's Dialogue Builder? ((evidence of unfamiliarity))

Based on this conversation, the system learns that the prediction was wrong, and that the user in fact does not know the concepts in question. The system then updates the individual user model for that user accordingly. See the updated individual user model 1300B'. In the example depicted in FIGS. 12A and 12B, the system makes the same assumption for both users, namely, that the users will recognize the name "Dialogue Builder." But the example demonstrates different kinds of responses from the user: "I've used it before!" versus "What's Dialogue Builder?" The former confirms that the assumption of the system was correct. The latter shows that it was incorrect. In each case, the individual user model for each user will be updated based on what the user said.

As will be described below, one or more elements of the present techniques can optionally be provided as a service in a cloud environment. For instance, by way of example only, one or more steps of methodology 100 of FIG. 1 can be performed on a dedicated cloud server to take advantage of high-powered CPUs and GPUs.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 13:
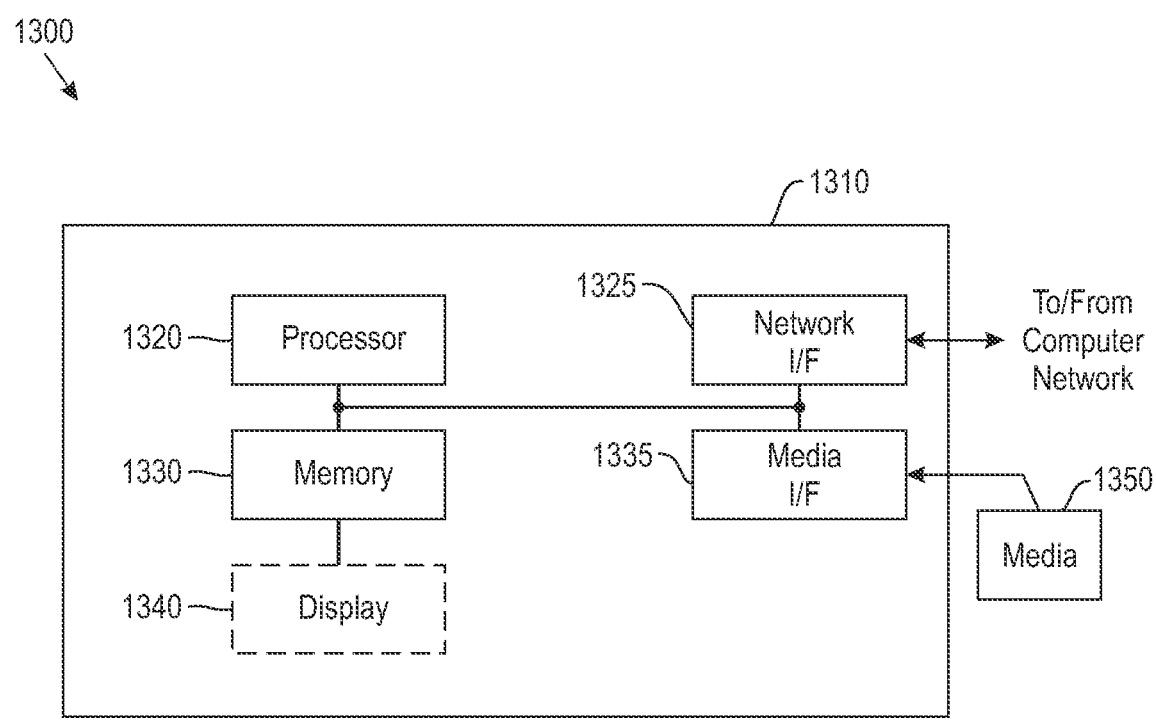
FIG. 13 is a diagram illustrating an exemplary apparatus for performing one or more of the methodologies presented herein according to an embodiment of the present invention.

Turning now to FIG. 13, a block diagram is shown of an apparatus 1300 for implementing one or more of the methodologies presented herein. By way of example only, automated conversational system 700 described in conjunction with the description of FIG. 7 above can be embodied in apparatus 1300 and can be configured to implement one or more steps of methodology 100 of FIG. 1.

Apparatus 1300 includes a computer system 1310 and removable media 1350. Computer system 1310 includes a processor device 1320, a network interface 1325, a memory 1330, a media interface 1335 and an optional display 1340. Network interface 1325 allows computer system 1310 to connect to a network, while media interface 1335 allows computer system 1310 to interact with media, such as a hard drive or removable media 1350.

Processor device 1320 can be configured to implement the methods, steps, and functions disclosed herein. The memory 1330 could be distributed or local and the processor device 1320 could be distributed or singular. The memory 1330 could be implemented as an electrical, magnetic or optical memory, or any combination of these or other types of storage devices. Moreover, the term "memory" should be construed broadly enough to encompass any information able to be read from, or written to, an address in the addressable space accessed by processor device 1320. With this definition, information on a network, accessible through network interface 1325, is still within memory 1330 because the processor device 1320 can retrieve the information from the network. It should be noted that each distributed processor that makes up processor device 1320 generally contains its own addressable memory space. It should also be noted that some or all of computer system 1310 can be incorporated into an application-specific or general-use integrated circuit.

Optional display 1340 is any type of display suitable for interacting with a human user of apparatus 1300. Generally, display 1340 is a computer monitor or other similar display.

Figure 14:
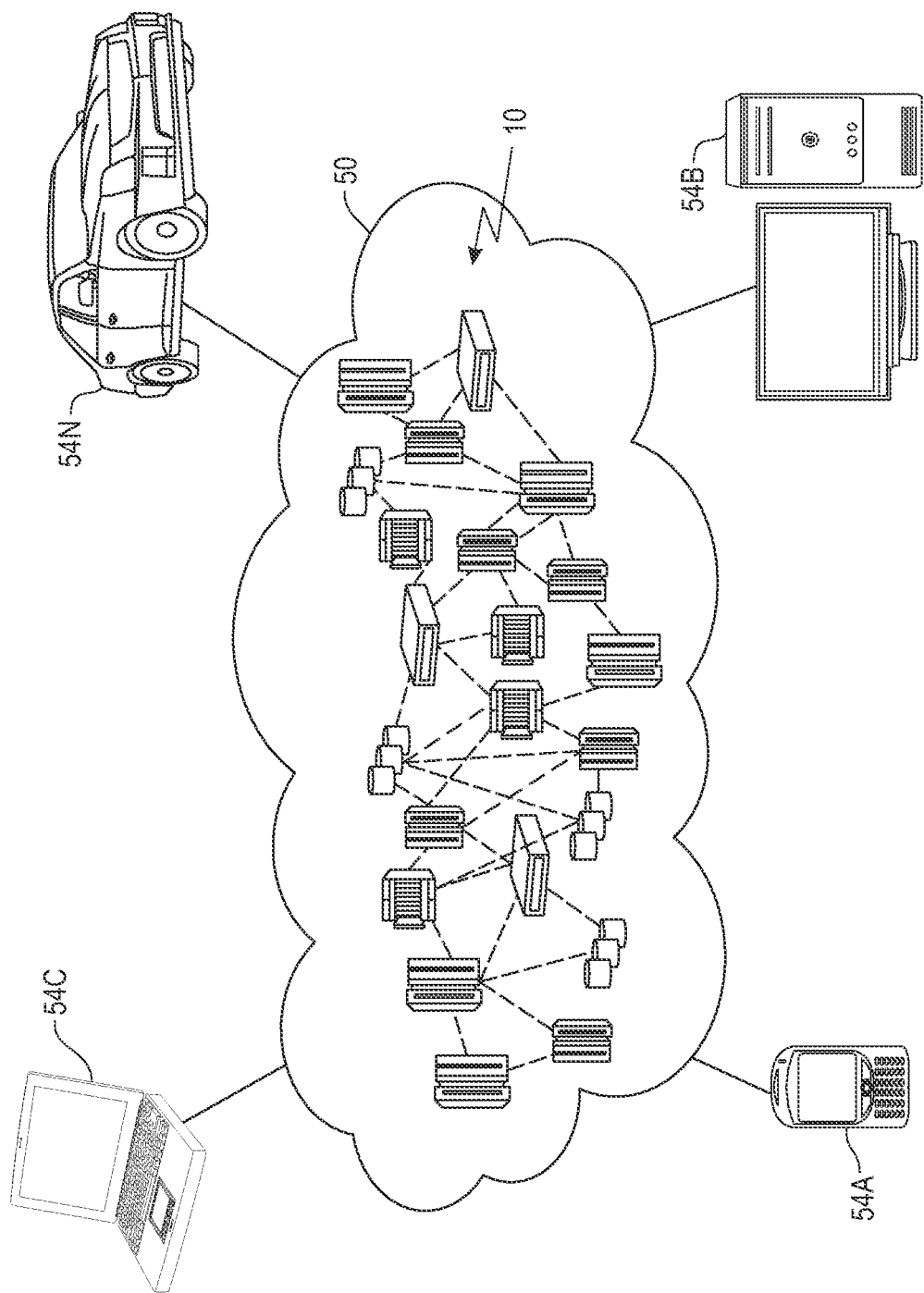
FIG. 14 depicts a cloud computing environment according to an embodiment of the present invention.
Figure 15:
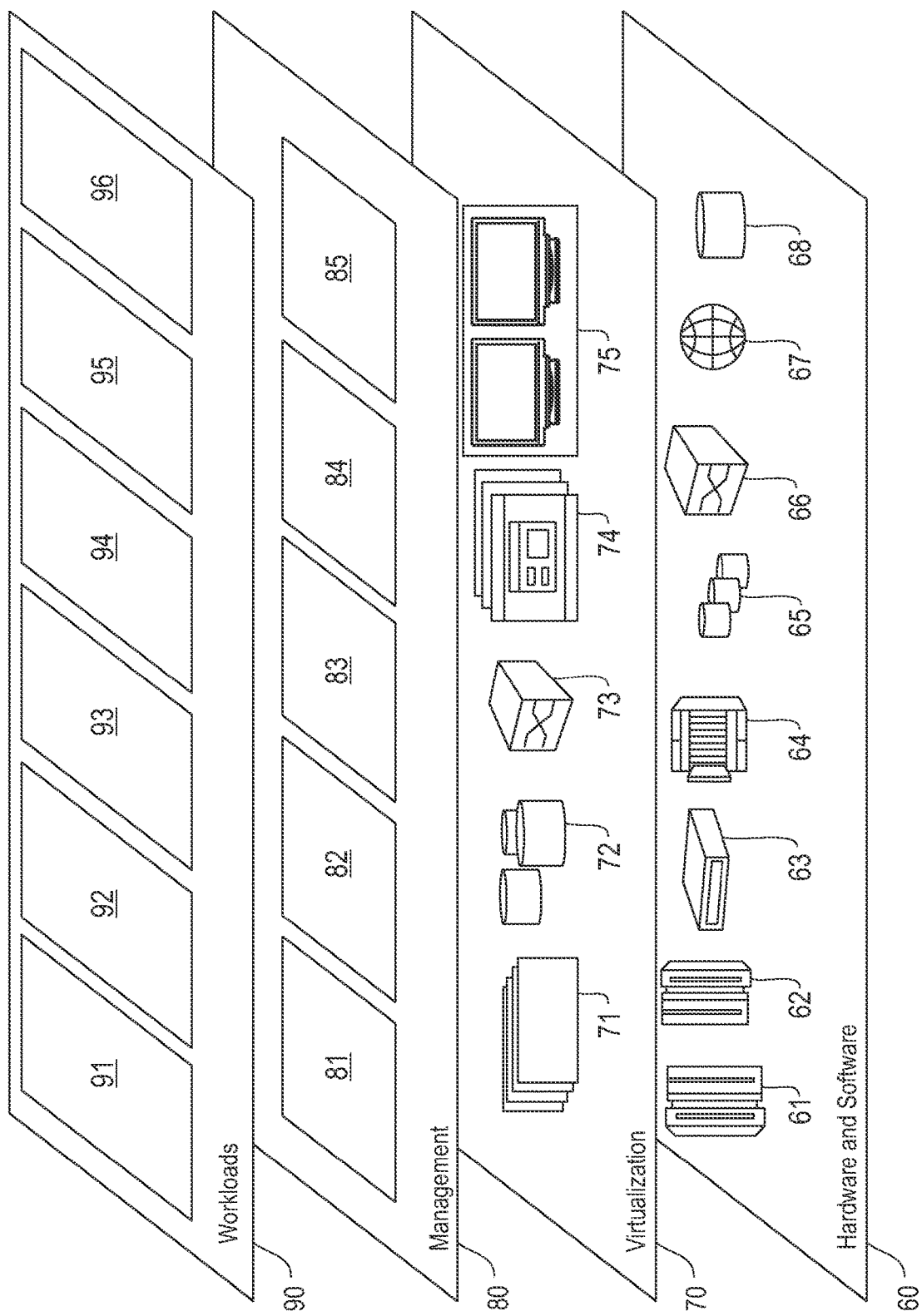
FIG. 15 depicts abstraction model layers according to an embodiment of the present invention.

Referring to FIG. 14 and FIG. 15, it is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 14, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 14 are intended to be illustrative only and that computing nodes 10 and cloud computing environment 50 can communicate with any type of computerized device over any type of network and/or network addressable connection (e.g., using a web browser).

Referring now to FIG. 15, a set of functional abstraction layers provided by cloud computing environment 50 (FIG. 14) is shown. It should be understood in advance that the components, layers, and functions shown in FIG. 15 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and personalizing an automated conversational system 96.

Although illustrative embodiments of the present invention have been described herein, it is to be understood that the invention is not limited to those precise embodiments, and that various other changes and modifications may be made by one skilled in the art without departing from the scope of the invention.

What is claimed is:

1. A computer-implemented method for personalizing an automated conversational system, the method comprising:
    making predictions of a familiarity of a user with concepts needed to understand a standard output utterance based on the familiarity of an aggregate of users and a background knowledge model utilizing a conditional probability table of the concepts and related concepts, wherein the standard output utterance assumes that the concepts are known;
    storing the predictions in an individual user model for the user;
    receiving, by the automated conversational system, a conversational response from the user to the output utterance;
    updating the individual user model for the user based on the conversational response in relation to each of the concepts and related concepts; and
    giving, by the automated conversational system, an output utterance that is tailored to the individual user model.

2. The method of claim 1, further comprising:
    comparing the individual user model for the user with the background knowledge model to determine a degree of overlap.

3. The method of claim 2, wherein the degree of overlap comprises how many of the related concepts the user knows.

4. The method of claim 1, further comprising:
    creating an aggregate user model for the aggregate of users.

5. The method of claim 4, wherein the aggregate user model is a Bayesian Network.

6. The method of claim 1, further comprising:
    building the background knowledge model using a publicly-available knowledge data base.

7. A method for personalizing an automated conversational system, the method comprising:
    making predictions of a familiarity of a user with concepts needed to understand a standard output utterance based on the familiarity of an aggregate of users and a background knowledge model utilizing a conditional probability table of the concepts and related concepts, wherein the standard output utterance assumes that the concepts are known;
    storing the predictions in an individual user model for the user; and
    receiving, by the automated conversational system, a conversational response from the user to the output utterance;
    updating the individual user model for the user based on the conversational response in relation to each of the concepts and related concepts; and
    giving, by the automated conversational system, the standard output utterance to the user when it is predicted that the user is familiar with the concepts, or a nonstandard output utterance when it is it is predicted that the user is unfamiliar with at least one of the concepts.

8. The method of claim 7, wherein the nonstandard output utterance provides a definition of the at least one concept with which the user is unfamiliar.

9. The method of claim 8, further comprising:
    updating the individual user model for the user to predict that the user is now familiar with the at least one concept for which the definition has been provided.

10. The method of claim 7, further comprising:
    comparing the individual user model for the user with the background knowledge model to determine a degree of overlap.

11. The method of claim 10, wherein the degree of overlap comprises how many of the related concepts the user knows.

12. The method of claim 7, further comprising:
    creating an aggregate user model for the aggregate of users.

13. The method of claim 12, wherein the aggregate user model is a Bayesian Network.

14. The method of claim 7, further comprising:
building the background knowledge model using a publicly-available knowledge data base.

15. A computer program product for personalizing an automated conversational system, the computer program product comprising a computer-readable storage medium having program instructions embodied therewith, the program instructions executable by a computer to cause the computer to:
make predictions of a familiarity of a user with concepts needed to understand a standard output utterance based on the familiarity of an aggregate of users and a background knowledge model utilizing a conditional probability table of the concepts and related concepts, wherein the standard output utterance assumes that the concepts are known;
store the predictions in an individual user model for the user;
receive, by the automate conversational system, a conversational response from the user to the output utterance;
update the individual user model for the user based on the conversational response in relation to each of the concepts and related concepts; and
give, by the automated conversational system, an output utterance that is tailored to the user given the predictions.

16. The non-transitory computer program product of claim 15, wherein the program instructions further cause the computer to:
store the predictions in an individual user model for the user; and
compare the individual user model for the user with the background knowledge model to determine a degree of overlap, wherein the degree of overlap comprises how many of the related concepts the user knows.

* * * * *